United States Patent [19]

Kay et al.

[11] 4,352,373
[45] Oct. 5, 1982

[54] DISC-REEL SOUND SUPPRESSOR

[75] Inventors: George Kay, Anaheim; Alan Keskinen, Van Nuys, both of Calif.

[73] Assignee: Vacco Industries, South El Monte, Calif.

[21] Appl. No.: 180,145

[22] Filed: Aug. 21, 1980

[51] Int. Cl.³ .............................................. F16K 47/08
[52] U.S. Cl. .............................. 137/561 A; 137/625.3; 251/127; 138/42
[58] Field of Search ...................... 251/127; 137/625.3, 137/561 A, 625.12; 138/42

[56] References Cited

U.S. PATENT DOCUMENTS

| | | | |
|---|---|---|---|
| 871,775 | 11/1907 | Blanchard et al. | 251/127 X |
| 2,572,640 | 10/1951 | Lovegrove | 137/625.14 X |
| 3,092,144 | 6/1963 | Green | 137/625.3 |
| 3,283,787 | 11/1966 | Davis | 138/42 X |
| 3,917,222 | 11/1975 | Kay et al. | 251/127 |
| 4,018,245 | 4/1977 | Baumann | 137/625.3 X |

Primary Examiner—Arnold Rosenthal
Attorney, Agent, or Firm—Frederick E. Mueller

[57] ABSTRACT

A sound suppressing fluid handling device wherein a relatively high pressure fluid is conducted through a substantial pressure drop, relatively noiselessly, by passage of the fluid through a myriad of tortuous energy dissipating passages formed between adjacent turns of and opening through the ends of a sound suppressing reel comprising a relatively thin flexible spirally wound band. The preferred inventive embodiment described is a valve comprising a stack of annular discs seating coaxially against the inlet end of the sound suppressing reel and containing passages, formed partly between adjacent discs, for conducting the incoming high pressure fluid from the central opening in the disc stack to the inlet ends of the reel passages.

16 Claims, 5 Drawing Figures

DISC-REEL SOUND SUPPRESSOR

BACKGROUND OF THE INVENTION

1. Field of the Invention

This invention relates generally to the fluid handling art and more particularly to an improved sound suppressing fluid handling device, such as a valve, for conducting a pressurized fluid relatively noiselessly through a substantial pressure drop.

2. Prior Art

Many fluid handling applications involve transmission of a pressurized fluid through a substantial pressure drop. This pressure drop normally occurs through valves of one kind or another but it may occur another way. In any event, unless preventative steps are taken, substantial noise is generated by the fluid as it undergoes the pressure drop due to cavitation and other causes. Reduction or elimination of this noise is often desirable or mandatory, depending on the nature of the fluid handling application.

A variety of mufflers and other sound suppressing fluid handling devices have been devised for this purpose. U.S. Pat. No. 3,917,222, for example, discloses a fluid suppressing flow control valve.

Generally speaking, such sound suppressing fluid handling devices attenuate sound by controlled dissipation of the fluid energy as the fluid undergoes its pressure drop. This energy dissipation is commonly accomplished by passage of the fluid through a myriad of tortuous passages formed within a sound suppressing device of some kind. In the above mentioned patent, for example, this sound suppressing device comprises a stack of annular discs with faces which are chemically etched or machined to form the energy dissipating passages between the discs. The particular valve described in this patent is designed for use with liquid or gas, and its sound suppressing or energy dissipating passages are designed to perform the additional function of achieving relatively constant velocity flow through the valve.

The design and fabrication of sound suppressing fluid handling devices of this kind presents three related problems with which this invention is concerned. These problems involve (a) maximizing the number and length of the fluid energy dissipating or sound suppressing fluid passages per unit volume so as to provide an effective sound suppressing fluid handling device of minimum overall size and yet possessing the desired flow capacity, (b) forming or fabricating the passages in a practical manner, adaptable, for example, to mass production techniques, and (c) packaging the sound suppressing means in a manner which is practical from a manufacturing standpoint and utilizes the sound suppressing function with maximum efficiency.

SUMMARY OF THE INVENTION

This invention provides an improved sound suppressing fluid handling device of the class described which solves these related problems in a unique manner.

To this end, the invention provides, according to one of its aspects, a fluid conducting sound suppressing means in the form of a reel consisting of a relatively thin, flexible, spirally wound band of metal or other suitable material. Extending through this reel between its adjacent turns and from one end of the reel to the other, are a myriad of flow passages for fluid energy dissipation. These passage means are dispersed throughout at least a major portion of the transverse section of the reel and exit through the coil ends.

According to the present invention, these passage means may be formed or fabricated in various ways. According to the preferred practice of the invention, however, the passage means are formed by etching at least one surface of the band in such a way as to form spaced lands or the like on the band. When the band is spirally wound into a reel, these lands on each turn of the reel abut the adjacent turn to define tortuous passage means between the lands and the respective turns.

In addition to the reel, the sound suppressing fluid handling device of the invention comprises a housing or body having a fluid passage communicating fluid inlet and outlet ports in the housing. In normal use of the fluid handling device, the inlet port of the housing receives a relatively high pressure fluid, and the outlet port communicates to a relatively low pressure region, such that fluid flowing through the device undergoes a substantial pressure drop within the housing.

The sound suppressing reel is contained within and laterally spans a portion of this passage with the central axis of the reel extending lengthwise of the passage portion. The turns of the reel are disposed face-to-face laterally of the passage portion containing the reel. Fluid flow from the inlet port to the outlet port of the fluid handling device thus occurs through the tortuous energy dissipating flow passages of the reel in a manner such that the fluid may undergo a relatively large pressure drop within the housing without the creation of cavitation noise and other noise.

Another aspect of the invention is concerned with how the fluid is transfered from the inlet port of the fluid handling device to the myriad of energy dissipating passage means within the sound suppressing reel. According to this aspect of this invention, fluid is conducted from the inlet port of the fluid handling device to the inlet ends of the reel passages. This is achieved by the flow passages contained in the inlet flow distributor which interfaces with the inlet end of the reel. These inlet flow distributor passages also perform a fluid energy dissipating or sound suppressing function, thus aiding the sound suppressing function of the reel.

In the presently preferred inventive embodiment described herein, this inlet flow distributor comprises a stack of thin annular discs seating coaxially against the inlet end of the sound suppressing reel. The aligned central apertures in these discs form a central opening through the disc stack which communicates with the inlet port of the fluid handling device. The fluid distributor passages extend radially out from this central opening between the discs and then axially through the discs to the inlet end of the passage means in the sound suppressing reel. The radial portions of the distributor passages are preferably formed by etching the distributor discs to form radial channels between the adjacent discs. This preferred embodiment is a valve including a valve member which is movable axially within the central flow distributor opening and the opening to the sound suppressing coil to open and close the valve.

DESCRIPTION OF THE PREFERRED EMBODIMENT

Figure 1:
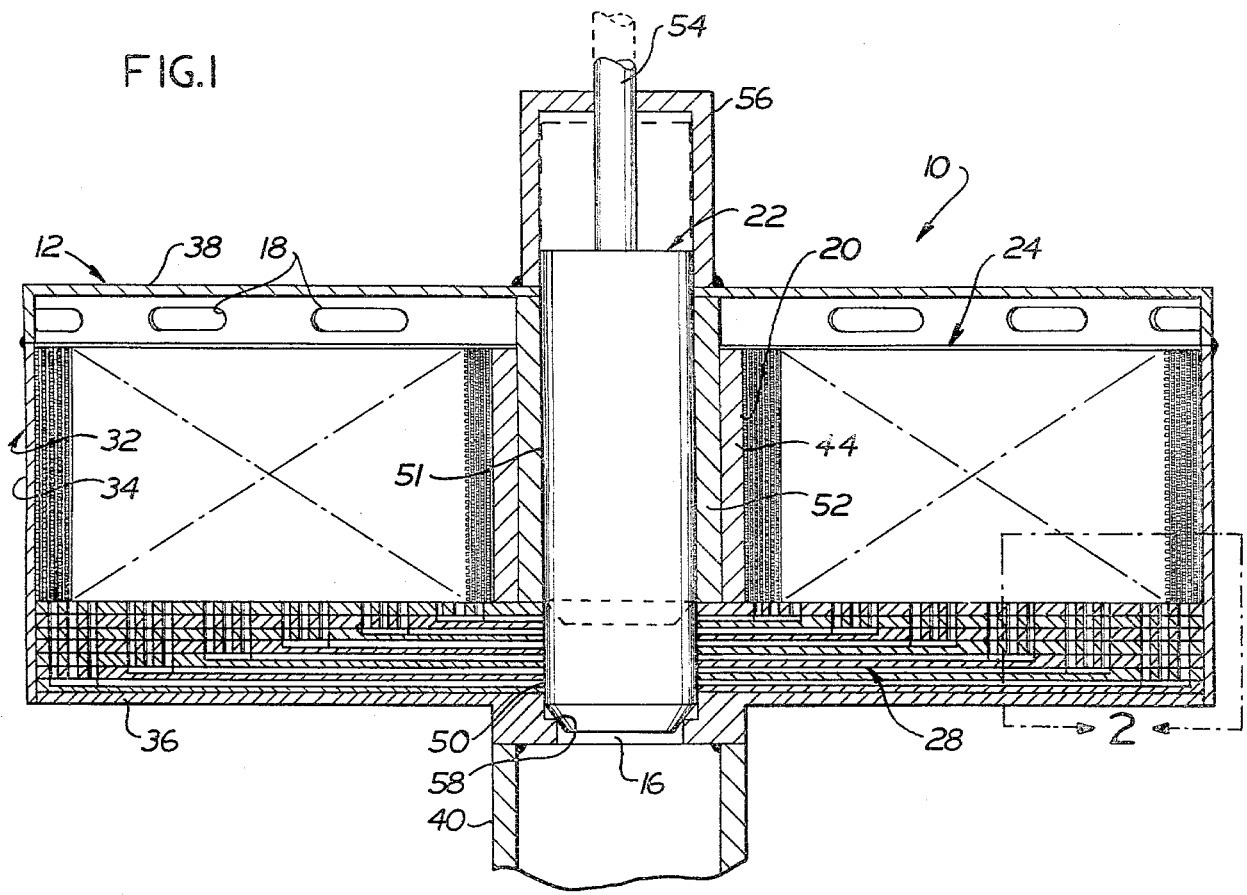
FIG. 1 is a longitudinal section through a sound suppressing fluid handling device, in this instance, a valve, according to the invention.

Referring now to these drawings, and particularly to FIG. 1, there is illustrated a sound suppressing fluid handling device 10, in this instance a valve, according to the invention. This valve comprises a housing 12 having fluid inlets and outlet ports 16, 18 and a fluid passage 20 communicating these ports. Movable within the housing 12 is a valve 22 from the inlet port 16 to the outlet port 18.

In normal use of the valve, the inlet port 16 receives a relatively high pressure fluid and the outlet port 18 communicates to a relatively low pressure region such that the fluid undergoes a substantial pressure drop within the valve. During passage of a fluid through such a pressure drop, it normally tends to generate substantial noise due to cavitation and other causes. The present invention is designed to suppress or attenuate and thereby substantially reduce or eliminate such noise.

To this end, there is positioned within the valve passage 20 a fluid energy dissipating or sound suppressing coil 24 for conducting the incoming high pressure fluid relatively noiselessly through its pressure drop. As explained in more detail below, this reel contains a myriad of tortuous fluid passage means 26 extending through the coil from one end to the other. The incoming high pressure fluid passes through these passage means which are designed to dissipate the fluid energy in a manner which suppresses or eliminates cavitation noise and other noise while providing a desired fluid flow rate through the valve.

Disposed within the valve housing 12, between its inlet port 16 and the noise suppressing reel 24, is an inlet flow distributor 28. This inlet flow distributor contains a multiplicity of fluid passages 30 for conducting the incoming high pressure fluid from the valve inlet port 16 to the sound suppressing reel passage means 26. These flow distributor passages also act to dissipate fluid energy and thereby aid the sound suppressing function of the coil 24.

Briefly, in normal use of the sound suppressing valve 10, the valve member 22 is movable to its solid line closed position of FIG. 1 to block fluid flow through the valve. The valve member is movable to its broken line full open position or to any intermediate position to permit fluid flow to the valve from its inlet port 16, through the inlet flow distributor 28 and the sound suppressing coil 24 to the fluid outlet port 18. During flow of the fluid through the inlet flow distributor and the sound suppressing reel, the fluid energy is progressively dissipated in a manner which suppresses or eliminates cavitation noise and other noise.

Referring now in more detail to the drawings, the valve housing 12 comprises a hollow cylindrical body 32 having an outer cylindrical wall 34 and end walls 36, 38. Extending coaxially from the lower end wall 36 is a sleeve or nipple 40 forming an inlet defining the inlet port 16. The particular valve shown is designed to handle a pressurized flow media gas, such as air, or water, and to vent this media to atmosphere or to a downstream piping system. To this end, the valve has a number of outlet ports 18 at the upper end of the cylindrical housing wall 34, above the sound suppressing coil 24.

The sound suppressing coil 24 is coaxially positioned within the valve body 32. This coil comprises a relatively thin flexible band 42 of metal or other suitable material spirally wound or coiled upon a sleeve 44 having a length approximating the width of the band to form an annular coil configuration having a relatively large number of turns. Projecting from one side of this band are a myriad of spaced projections or lands 46 of substantially the same height. These lands may be formed in various ways and in various shapes, as by photographic etching process. The particular lands 46 illustrated have a pad-like configuration.

Figure 2:
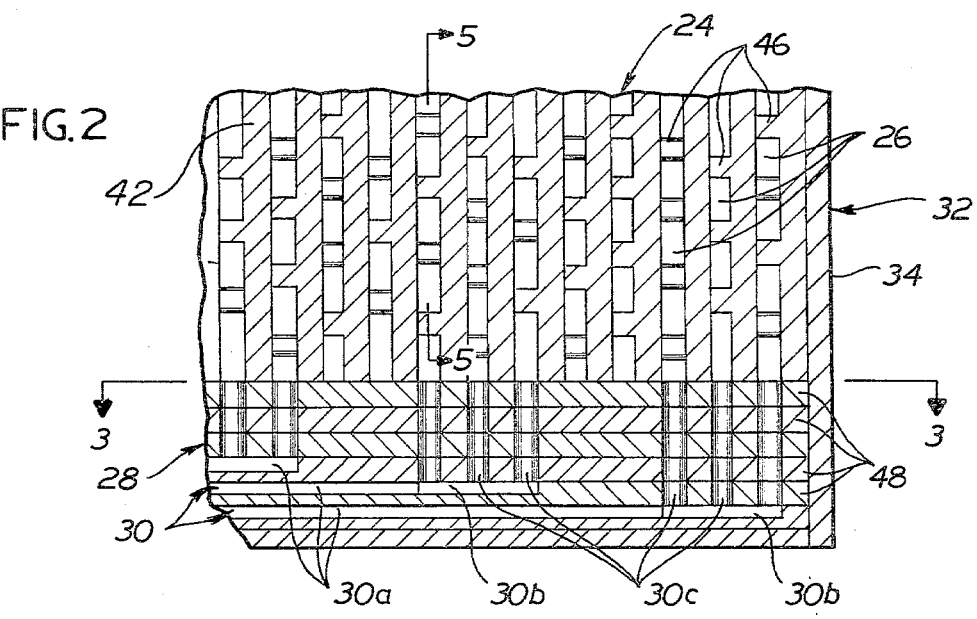
FIG. 2 is an enlargement of the area encircled by the arrow 2 in FIG. 1.
Figure 3:
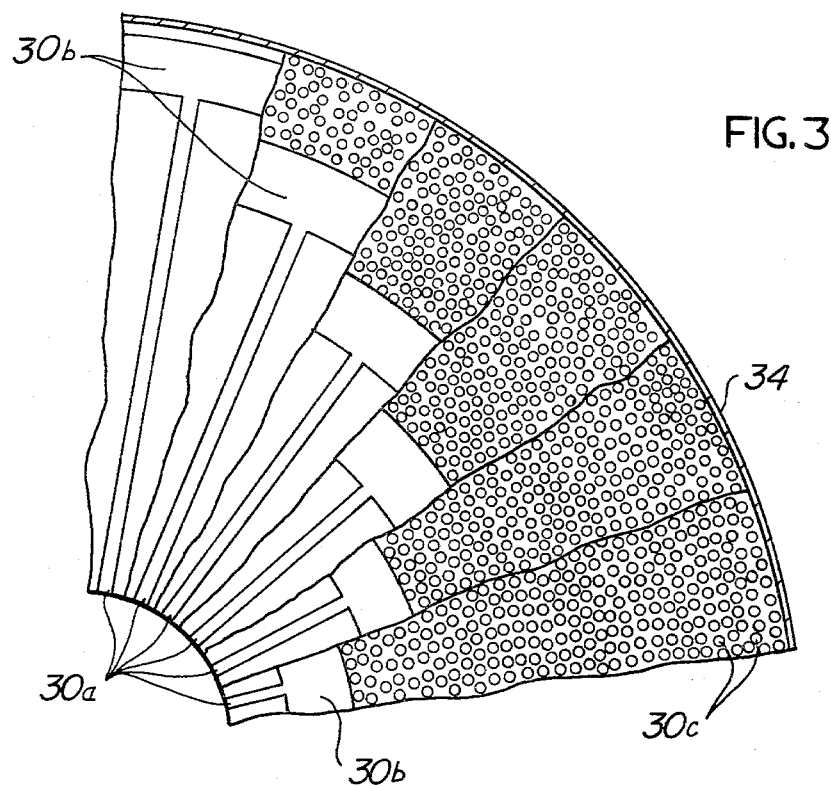
FIG. 3 is a fragmentary section through the inlet flow distributor, taken on line 3—3 in FIG. 2, with portions of the distributor discs broken away for clarity.
Figure 4:
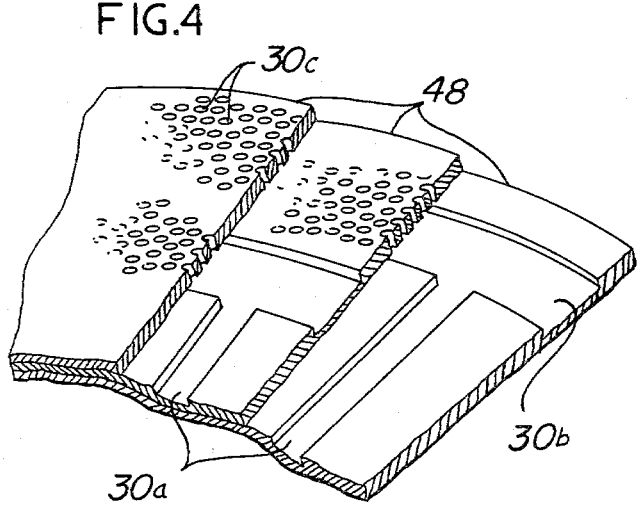
FIG. 4 is a fragmentary perspective view of a portion of the structure shown in FIG. 3.
Figure 5:
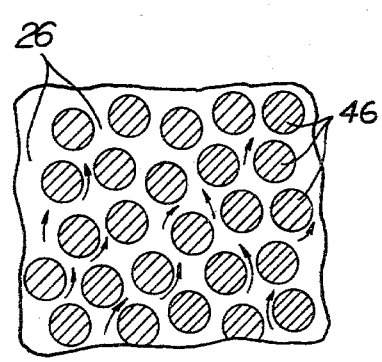
FIG. 5 is an enlarged section taken on line 5—5 in FIG. 2 illustrating the sound suppressing passages.

When the band 42 is spirally wound to form the coil 24, the lands 44 on each turn of the coil abut an adjacent turn, as shown best in FIG. 2, to form the reel passage means 26 between the lands. The tortuous configuration of these reel passage means may be best observed in FIG. 5. Passage means 26 extend from one end of the reel 24 to the other and open through the reel ends. The lower ends of the reel passage means, as viewed in the drawings, are called their inlet ends and their upper ends are referred to as their outlet ends. As shown in FIG. 1, the reel 24 is spaced from the lower valve body wall 36 to receive therebetween the inlet flow distributor 28 and from the upper valve body wall 38 to clear the valve outlet ports 18.

The inlet flow distributor 28 is an annular assembly of stacked annular discs 48 coaxially disposed between and seating against the lower valve body wall 36 and the lower inlet end of the sound suppressing reel 24. The flow passages 30 of the flow distributor comprise circularly spaced radial portions 30a, annular portions 30b, and axial portions 30c. The radial passage portions 30a extend radially of the distributor disc 48 from the central opening 50 through the inlet flow distributor to the annular passage portions 30b. The axial portions 30c extend axially through the stack of discs, preferably in staggered, eccentric but overlapping relationship, in line with the annular passage portions 30b. The inlet flow distributor passages 30 are arranged in such a way that fluid flow occurs from the central distributor opening 50 through the passages to the lower inlet end of the passage means 26 in the sound suppressing reel 24.

To this end, the annular portions 30b of the flow passages 30 in the inlet flow distributor 28 are located at successively greater radial distances from the center of the distributor, from the uppermost distributor disc 48 to the lowermost disc. The discs contain a myriad of the axial passage portions 30c for communicating the annular passage portion 30b with a maximum number of the reel passage means 26. Accordingly, it will be understood that flow of the incoming high pressure fluids occurs from the valve inlet 16 into the central opening 50 of the inlet flow distributor 28 and then from this opening through the radial distributor flow passage portion 30a into the annular flow passage portions 30b and finally from these latter passage portions through the axial passage portions 30c in the distributor disc 48 to the passage means 26 in the sound suppressing reel 24. The axial passage portions 30c may be randomly or uniformly spaced from one another but preferably define a tortuous passage.

The inlet flow distributor passages 30 may be formed in various ways. According to the preferred practice of the invention, the radial and annular portions 38, 30b of these distributor passages are photographically etched in the upper surfaces of the distributor discs 48. The axial passage portions 30c are also etched or may be drilled or otherwise formed through the discs.

The valve member 22 has a cylindrical plunger-like body 51 axially movable within a valve sleeve 50 fixed centrally within the valve body 32. This valve sleeve extends between the upper valve body wall 38 and the uppermost disc 48 of the inlet flow distributor 28 and through the central sleeve 44 of the sound suppressing coil 24. the central opening in the valve sleeve 52 and the central opening 50 in the inlet flow distributor 28 have the same diameter which is sized to receive the valve 51 with a close sliding fit. The valve sleeve 52, in turn, fits snugly within the coil sleeve 44.

The upper end of the valve member 22 has an operating stem 54 which extends externally of the valve body 32 through an opening in a cap 56 fixed to the upper valve body wall 38. This valve stem mounts a handle or is connected to a mechanism, solenoid or the like, for moving the valve member 22 axially between its open and closed position. The lower end of the valve member is bevelled to engage a valve seat 58 about the inlet port 16 when the valve member occupies its solid line closed position of FIG. 1.

It will now be understood that when the valve member 22 occupies its solid line closed position of FIG. 1, flow through the valve 10 is blocked. Opening movement of the valve member unseats the latter from its valve seat 58 and progressively uncovers the inner ends of the inlet flow distributor flow passages 30. High pressure fluid may then flow from the inlet port 16, through the inlet flow distributor passages 30, to the sound suppressing reel 24, then through the passage means 26 in this reel into the space between the upper end of the reel and the upper valve body wall 38, and finally from this space to the exterior of the valve housing through its outlet ports 18.

The passage means 30, 26, in the inlet flow distributor 28 and the sound suppressing reel 24, and especially the reel passage means, dissipate the fluid energy during its pressure drop through the valve so as to suppress or minimize cavitation noise and the like. The novel spiral band construction of the reel achieves a maximum number of passages per unit volume and ease of fabrication, particularly by mass production techniques. The novel stacked disc arrangement of the inlet flow distributor 28 achieves the same ends with regard to the flow distributor and, in addition, optimum flow of the incoming high pressure fluid from the valve inlet port 16 to the sound suppressing reel 24. Thus, the invention provides a sound suppressing valve which is ideally suited for mass production techniques, achieves a maximum number of sound suppressing fluid passages per unit volume and thereby a valve characterized by a minimum overall size for a given flow capacity.

I claim:

1. A sound suppressing fluid handling device for conducting a pressurized fluid relatively noiselessly through a substantial pressure drop, comprising:
   a housing having fluid inlet and outlet ports and fluid passage communicating said ports;
   a sound suppressing reel positioned within and laterally spanning a longitudinal portion of said passage with the central axis of the reel aligned longitudinally of said passage portion comprising a relatively thin spiral, imperforate band having its adjacent turns disposed face to face laterally of said passage portion in fixedly spaced apart relationship to define laterally discrete passages between said adjacent turns; and
   means integral with said band determining the spacing between said adjacent turns and forming a myriad of tortuous fluid energy dissipating flow paths extending through said discrete passages from one end of the reel to the other, said passages having inlet ends opening through the reel end adjacent said inlet port and outlet ends opening through the opposite reel end, whereby fluid flow occurs from said inlet port through said reel passages to said outlet passage port, and said means dissipate energy in said fluid to suppress cavitation noise and the like.

2. The sound suppressing fluid handling device of claim 1 wherein:
   said means comprise spaced lands on one face of each reel turn abutting the adjacent reel turn to form said tortuous flow paths between said lands.

3. The sound suppressing fluid handling device of claim 1 wherein:
   said fluid handling device is a valve including a movable valve member for controlling fluid flow from said inlet port to said reel.

4. The sound suppressing fluid handling device of claim 1 including:
   flow distributor means between said reel and said inlet port for conducting incoming fluid relatively uniformly from said inlet port to said reel passages throughout substantially the entire transverse section of said reel.

5. A sound suppressing fluid handling device for conducting a pressurized fluid relatively noiselessly through a substantial pressure drop, comprising:
   a housing having fluid inlet and outlet ports and a fluid passage communicating said ports;
   a sound suppressing reel positioned within and laterally spanning a longitudinal portion of said passage with the central axis of the reel aligned longitudinally of said passage portion, said reel comprising a relatively thin spiral band having its adjacent turns disposed face to face laterally of said passage portion in fixedly spaced apart relation, said band having integral means determining the spacing between adjacent turns of said band and defining a myriad of tortuous fluid energy dissipating reel passage means in said laterally discrete passages; and
   flow distributor means between said reel and said inlet port for conducting incoming fluid relatively uniformly from said inlet port to said reel passage means throughout substantially the entire transverse section of said reel;
   said inlet flow distributor means comprising an annular distributor seating coaxially against said adjacent reel and having a central opening on said axis forming a portion of said flow passage between said inlet port and said reel, and passages extending through said distributor from said central opening to said inlet ends of said reel passage means.

6. The sound suppressing fluid handling device of claim 5 wherein:
   said distributor body passages include portions extending radially outward from said central distributor and portions extending axially through said distributor from said radial passage portions to said reel passage means.

7. The sound suppressing fluid handling device of claim 6 wherein:

said inlet flow distributor comprises a stack of annular discs disposed in coaxially face-to-face relation with one another and said reel, and means on said discs forming said distributor passages.

8. The sound suppressing fluid handling device of claim 7 wherein:

said distributor passage forming means comprise channels formed in the faces of said discs.

9. The sound suppressing fluid handling device of claim 1 wherein:

said fluid handling device is a valve including an annular flow distributor between said sound suppressing reel and said valve inlet and seating coaxially against said adjacent reel end and having a central opening on said reel axis, and passages extending through said flow distributor from said central opening to said inlet ends of said passage means, and said valve also includes a valve member movable axially through said central flow distributor opening to control fluid flow from said inlet port to said reel.

10. The sound suppressing fluid handling device of claim 9 wherein:

a valve seat is formed about said inlet port for engagement by said valve member to block fluid flow from said inlet port to said reel.

11. The sound suppressing fluid handling device of claim 1 wherein:

said fluid handling device is a valve including an annular flow distributor comprising a stack of annular discs disposed in coaxially face-to-face relation with one another and said reel between the latter and said inlet port, said discs having aligned central openings on the reel axis communicating with said inlet port, fluid passages extending through said distributor, partly between said distributor discs from said central opening to said inlet ends of said reel passage means, and a valve member movable axially within said central distributor opening for controlling fluid flow from said inlet port through said distributor passages to said sound suppressing reel.

12. The sound suppressing fluid handling device of claim 11 including:

a valve seat about said inlet port for seating engagement by said valve member to block fluid flow from said inlet port to said reel.

13. A sound suppressing means for a fluid handling device of the class described, comprising:

a sound suppressing reel comprising a relatively thin flexible spiral band having its turns disposed in face-to-face relation;

a means forming a myriad of relatively tortuous fluid energy dissipating passage means extending through said reel between its adjacent turns and from one end of the reel to the other for conducting fluid through said reel while dissipating the fluid energy in such a way as to suppress cavitation noise and the like; and an inlet flow distributor seating coaxially against one end of said reel having a central opening on the reel axis for receiving a pressurized fluid and passage means for conducting fluid from said central opening to the adjacent ends of said reel passage means.

14. The combination of claim 13 wherein:

the inlet flow distributor comprises a stack of annular discs defining said distributor passages partly between the adjacent discs.

15. In a sound suppressing fluid handling device having a sound suppressor means for conducting a pressurized fluid relatively noiselessly through a substantial pressure drop in an axial direction throughout the radial extent of the sound suppressor means, the improvement comprising:

an annular inlet flow distributor coaxially abutting the inlet end of said sound suppressor means throughout its radial extent, said inlet flow distributor comprising a stack of annular discs disposed in face-to-face relationship, said stack having a central opening and a plurality of individual passages extending from said central opening to terminate at their other ends in communication with the inlet end of said sound suppressor means at radially spaced apart locations.

16. The flow distributor of claim 15 wherein:

said distributor passages comprise radial channels entering one side of certain discs to form between the adjacent discs radial passage portions extending radially outward from said central distributor opening, annular channels entering said disc sides and forming annular passage portions between the adjacent discs communicating with the outer ends of said radial passage portions, and axial passage portions extending through said discs and communicating with said annular passage portions.

* * * * *